(No Model.)

W. FINDEISEN.
WAGON AXLE.

No. 355,603. Patented Jan. 4, 1887.

Witnesses.
A. Ruppert
A. E. Grant

Inventor.
Wm. Findeisen,
Per
Thomas P. Simpson,
Atty.

UNITED STATES PATENT OFFICE.

WILLIAM FINDEISEN, OF FERGUS FALLS, MINNESOTA.

WAGON-AXLE.

SPECIFICATION forming part of Letters Patent No. 355,603, dated January 4, 1887.

Application filed May 6, 1886. Serial No. 301,345. (No model.)

*To all whom it may concern:*

Be it known that I, WILLIAM FINDEISEN, a citizen of the United States, residing at Fergus Falls, in the county of Otter Tail and State of Minnesota, have invented certain new and useful Improvements in Applying Truss-Rods to Wooden Axles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention consists in combining, constructing, and arranging several parts about an axle, as hereinafter described, and pointed out in the claim.

Figure 1:
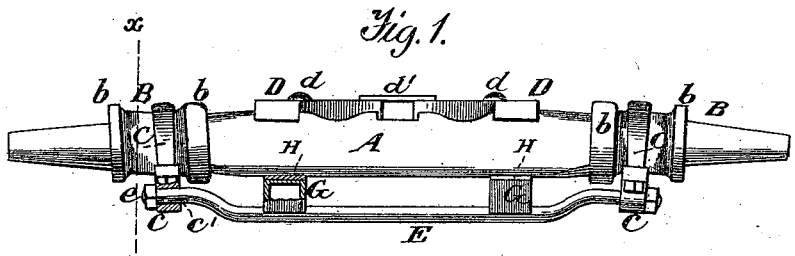
Figure 2:
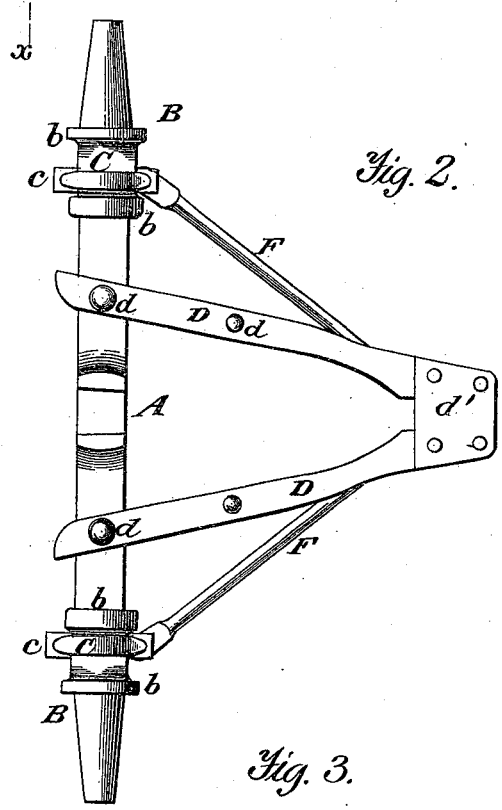
Figure 3:
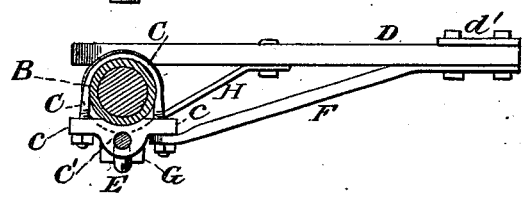

Figure 1 of the drawings is a rear view of the axle in elevation. Fig. 2 is a view in perspective of the axle, hounds, and braces, and Fig. 3 is a cross-section on line $x\ x$ of Fig 1.

In the drawings, A represents an axle provided with skeins B B, having the annular ribs or collars $b\ b$. C C are the clips which are employed to hold the skeins in place by means of end threads, nuts, and a bottom cross-plate. D D are the usual hounds, held by bolts $d\ d$ to the axle and connected in front by a plate, $d'$. These devices are already well known to the public.

I make the clip-plates $c$ with a median hole or groove, $c'$, to receive the ends of the truss-rod E, whose ends are threaded and provided with nuts $e$. I also connect one arm of the clip C with a rod, F, which is securely fastened to and under the front end of the hounds D. This serves effectually to preserve the hounds rigidly in their true position with respect to the axle.

G G are hollow caps between the axle and truss-rod, on which the latter rests, as shown in Fig. 1 of the drawings. These caps may rest on or be integral with the braces H H, which extend out under the hounds, and are fastened thereto, so as to assist in taking the downward strain upon them.

My truss-rod answers three purposes: first, it holds the clips firmly in place, so that they cannot slip down on the skeins or thimbles, to any of which my invention can be easily applied. It also holds the thimble and strengthens axle.

What I claim as new, and desire to protect by Letters Patent, is—

The combination, with a wooden axle, of the skeins having collars $b\ b$, the clips having plates grooved at $c'$, the end-threaded truss-rod E, passing through said grooves, nutted on the ends and supported on rests G, and the hound-braces F, held on one arm of the clips, whereby the skeins, truss-rod, and hound-braces are all coupled with the clips, as shown and described.

In testimony whereof I affix my signature in presence of two witnesses.

WM. FINDEISEN.

Witnesses:
 R. C. NOBEN,
 C. M. KNAPP.